United States Patent
Liebich et al.

(10) Patent No.: US 8,706,707 B2
(45) Date of Patent: Apr. 22, 2014

(54) SYSTEMS AND METHODS FOR MODELING COSTED ENTITIES AND PERFORMING A VALUE CHAIN ANALYSIS

(75) Inventors: Gunther Liebich, Walldorf (DE); Peter Von Zimmermann, Angelbachtal (DE); Roman Rapp, Antibes (FR)

(73) Assignee: SAP AG, Walldorf (DE)

( * ) Notice: Subject to any disclaimer, the term of this patent is extended or adjusted under 35 U.S.C. 154(b) by 1822 days.

(21) Appl. No.: 10/975,999

(22) Filed: Oct. 29, 2004

(65) Prior Publication Data

US 2005/0120032 A1   Jun. 2, 2005

Related U.S. Application Data

(60) Provisional application No. 60/515,411, filed on Oct. 30, 2003, provisional application No. 60/539,974, filed on Jan. 30, 2004.

(51) Int. Cl.
*G06F 17/30* (2006.01)

(52) U.S. Cl.
USPC .......................................... 707/705; 707/726

(58) Field of Classification Search
USPC ................................. 707/705, 726
See application file for complete search history.

(56) References Cited

U.S. PATENT DOCUMENTS

| | | | |
|---|---|---|---|
| 4,012,725 A | 3/1977 | Spangler et al. | |
| 4,180,854 A | 12/1979 | Walden et al. | |
| 4,949,292 A | 8/1990 | Hoshino et al. | |
| 5,559,939 A | 9/1996 | Wada et al. | |
| 5,633,998 A | 5/1997 | Schlafly | |
| 5,721,911 A * | 2/1998 | Ha et al. | 707/100 |
| 5,787,453 A | 7/1998 | Kennedy | |
| 5,819,102 A | 10/1998 | Reed et al. | |
| 5,897,649 A | 4/1999 | Kennedy | |
| 6,020,896 A | 2/2000 | Demeure et al. | |
| 6,061,749 A | 5/2000 | Webb et al. | |
| 6,138,130 A | 10/2000 | Adler et al. | |
| 6,259,456 B1 | 7/2001 | Gibson et al. | |
| 6,292,811 B1 | 9/2001 | Clancey et al. | |
| 6,388,672 B1 | 5/2002 | Ide et al. | |
| 6,625,499 B2 | 9/2003 | Abdalla | |
| 6,816,862 B2 * | 11/2004 | Mulgund et al. | 707/10 |
| 2002/0057446 A1 | 5/2002 | Long et al. | |
| 2003/0188256 A1 | 10/2003 | Aureglia et al. | |
| 2004/0148585 A1 * | 7/2004 | Sengodan | 717/101 |
| 2005/0060271 A1 * | 3/2005 | Vig | 705/400 |

(Continued)

OTHER PUBLICATIONS

A. Graeber, U.S. Appl. No. 10/898,921, filed Jul. 27, 2004, entitled "Systems and Methods for Implementing Formulas."
SAP Manual for Online Help, "Concurrent Costing" Release 350, Copyright 2003 (Mar. 6, 2003), pp. 1-42.

(Continued)

*Primary Examiner* — Kim Nguyen
(74) *Attorney, Agent, or Firm* — Finnegan, Henderson, Farabow, Garrett & Dunner, L.L.P.

(57) ABSTRACT

Methods and systems are disclosed for modeling costed entities and performing a value chain analysis. In one implementation, methods and systems may implement a costing platform. The costing platform may be adapted for modeling any set of costed entities and processing value chains. Value chains may be modeled by a user via the costing platform, so that networks comprised of objects and edges, and costed entities located at the objects can be modeled and functions can be added to determine key figures.

27 Claims, 9 Drawing Sheets

(56) References Cited

U.S. PATENT DOCUMENTS

| | | | |
|---|---|---|---|
| 2006/0224428 A1* | 10/2006 | Schmidt et al. | 705/8 |
| 2006/0224702 A1* | 10/2006 | Schmidt et al. | 709/219 |
| 2006/0253467 A1* | 11/2006 | Ramsey et al. | 707/100 |
| 2007/0192254 A1* | 8/2007 | Hinkle | 705/51 |
| 2007/0226090 A1* | 9/2007 | Stratton | 705/30 |
| 2008/0104383 A1* | 5/2008 | Ardagna et al. | 713/1 |
| 2012/0102570 A1* | 4/2012 | Herz | 726/25 |
| 2013/0305377 A1* | 11/2013 | Herz | 726/25 |

OTHER PUBLICATIONS

Jankun-Kelly, J.T., et al., "A Spreadsheet Interface for Visualization Exploration," Proceedings of the Conference on Visualization '00 VIS '00, Oct. 2000, pp. 69-77.

Griewonk, Andreas, et al., "Algorithm 755: ADOL-C: A Package for the Automatic Differentiation of Algorithms Written in C/C++", Transactions on Mathematical Software (TOMS), vol. 22, Issue 2, Jun. 1996, pp. 131-167.

* cited by examiner

SYSTEMS AND METHODS FOR MODELING COSTED ENTITIES AND PERFORMING A VALUE CHAIN ANALYSIS

CROSS-REFERENCE TO RELATED APPLICATION(S)

This application claims the benefit of priority of U.S. Provisional Application No. 60/515,411, entitled "Systems and Methods for Value Chain Analysis," filed on Oct. 30, 2003, and U.S. Provisional Application No. 60/539,974, entitled "Systems and Methods for Value Chain Analysis," filed on Jan. 30, 2004, the disclosures of which are expressly incorporated herein by reference to their entireties.

BACKGROUND OF THE INVENTION

I. Field of the Invention

The present invention generally relates to electronic data processing and to systems and methods for evaluating costs and measuring performance. More particularly, the invention relates to systems and methods that allow a user to model and evaluate any set of costed entities, such as business-related activities associated with running a business or developing and providing a product or service, or other costed entities such as resources, personnel, products, parts or raw materials.

II. Background Information

The success of an organization is often tied to its ability to perform and effectively implement business processes. To achieve success and provide value to customers, an organization will often analyze its business-related activities and other costed entites to achieve maximum performance and value. Business process analysis is one way to improve business processes. Such an analysis may involve measuring, evaluating, and optimizing business process performance. By analyzing its processes and use of resources, a company can better identify factors contributing to revenue loss and/or optimize its deployment of resources.

In the business world, different methodologies exist for evaluating costs and measuring performance. By way of example, concurrent costing is one methodology for planning, monitoring, and optimizing the costs of a new product or service. Concurrent costing may be performed during the planning, designing, and/or offer phases. By performing a concurrent costing simulation at an early phase of a product's or service's life cycle, a business may estimate and ultimately control the real costs associated with producing or offering the product or service.

The process of analyzing costs across different costed entities is known as a value chain analysis. To perform a value chain analysis, actual or hypothetical entities may be modeled to determine the costs associated with the modeled entities. The costed entities may encompass any set of business-related activities, or any other valuated entity such as resources, personnel, products, parts or raw materials. Modeling and analyzing the costs associated with a set of business-related activities, such as designing and manufacturing a product, may be a critical aspect of bringing that product to market. The same can also be said for designing and offering a service.

To determine costs and measure, businesses often use software or computerized modeling tools. By using modeling software, a business can simulate, beforehand, the expected costs associated with costed entities. In doing so, the business is able to anticipate and plan for the costs throughout all phases of design and production. In addition, by simulating expected costs, it is possible to vary and control actual costs, such as the cost of materials or labor. For instance, by varying the choice of materials, a business can determine the affect of substituting one material for another.

Conventional modeling tools, such as those provided with enterprise resource planning (ERP) systems, typically implement specific methodologies and structures to model and process a value chain. For example, in ERP systems of SAP AG (Walldorf, Germany), there are numerous components in the Controlling (CO) module for processing costed entities, such as Overhead Management (CO-OM), Profitability Analysis (CO-PA) and Product Costing (CO-PC). These components use different methods and structures to model and process a value chain (e.g., assessments and activity allocations in CO-OM, top-down distribution in CO-PA, hierarchical costing structures in CO-PC, etc.). As a result, existing solutions may perform functionality that only encompass part of the process necessary to perform a complete value chain analysis. Moreover, due to the diversity in these types of modeling tools, it is often difficult to analyze relationships between the results from one software component and another.

Businesses are also limited by the way modeling tools are hard-coded or programmed. For example, a software module may only allow a business to vary specific parameters or restrict a user from adding great levels of detail. In addition, because pre-existing software modules are often designed for use by a variety of businesses, such solutions may not address the varied concerns that different businesses may have when determining the cost of bringing a particular product or service to market. For example, a modeling tool might not consider that what might work well for a small business, might be ill suited for a larger business. Instead, the software modules are designed with a one size fits all approach. Consequently, software modules with such a design approach do not allow a particular business to configure the simulation process(i.e., to vary the metadata) to take into account a particular business' needs. Furthermore, the flexibility of costing operation applications varies, and considerable effort may often be required to incorporate new logistical concepts and objects.

Therefore, conventional software tools and computerized systems are limited and suffer from one or more drawbacks. Such solutions are typically not compatible or flexible enough to permit a complete value chain analysis across different components. In addition, because these solutions are not configurable, they are not re-usable and do not take into consideration the needs of particular businesses or end users.

In view of the foregoing, there is a need for improved systems and methods for modeling costed entities and performing a value chain analysis. For example, there is a need for a consistent approach or platform for modeling costed entities. There is also a need for systems and methods for performing a value chain analysis that allow a business to customize or modify the process to meet its unique needs. There is also a need for systems and methods which are both re-useable and flexible, and enable a user to model and analyze costs and measure performance across different costed entities.

SUMMARY OF THE INVENTION

Consistent with embodiments of the present invention, systems and methods are disclosed for performing a value chain analysis. Such systems and methods may be implemented to provide a flexible and re-useable framework for modeling a value network and performing a value chain analysis, while meeting the unique needs of a particular business or end user.

In one embodiment, a method is provided for modeling a set of costed entities and performing a value chain analysis. The method may comprise: creating a model of the set of costed entities, the model comprising an instantiated network configuration of elements. Creating the model may comprise defining the network configuration based on metadata provided as input from a user. Further, the method may additionally comprise performing an evaluation based on the model.

In another embodiment, a system is provided for configuring a network to perform a value chain analysis. The system comprises: a configuration user interface adapted to receive input from a user; and a configuration database. The configuration database may store structural metadata and functional metadata defined by the user based on input received through the configuration user interface. The structural metadata may define object types and edge types of a network configuration representing a set of costed entities, and the functional metadata defining formulas to evaluate, for example, key figures.

In another embodiment, a method is provided for configuring a network representing a set of costed entities to be evaluated, the set of costed entities relating to business-related activities. The method may comprise: creating a user-defined network configuration based on structural metadata and functional metadata received as input from a user; and storing the structural metadata and functional metadata in a configuration database to provide a metadata persistency of the network.

In yet another embodiment, a method is provided for performing a value chain analysis. The method comprises: receiving, as input from a user, a selection of a network configuration for a set of costed entities; loading the network into a runtime environment and creating runtime objects, the runtime objects representing a model of the costed entities; initiating a solver module to evaluate the runtime objects; and outputting a result of the evaluation. The result may be presented as output to a user (e.g., on a display screen or printed report) or as an output signal to a control system (e.g., a control signal for a manufacturing system).

In yet another embodiment, a computerized system is provided for performing a value chain analysis on a set of costed entities. The system may comprise: means for creating a model of the set of costed entities, the model comprising an instantiated network configuration of elements, wherein the means for creating the model comprises means for defining the network configuration based on metadata provided as input from a user; and means for performing an evaluation based on the model.

In still yet another embodiment, a computer readable medium is provided comprising programmable instructions adapted to perform a method for configuring a network. The network may represent a set of costed entities to be evaluated. The method may comprise: creating a user-defined network configuration based on structural metadata and functional metadata received as input from a user; and storing the structural metadata and functional metadata in a configuration database to provide a metadata persistency of the network.

In still yet another embodiment, a computer readable medium is provided comprising programmable instructions adapted to implement a method for performing a value chain analysis. The method comprises: receiving, as input from a user, a selection of a network configuration for a set of costed entities; loading the network configuration into a runtime environment and creating runtime objects, the runtime objects representing a model of the costed entities; initiating a solver module to evaluate the network by evaluating runtime objects associated with the loaded network; and outputting a result of the evaluation to the user.

In one embodiment of the present invention, objects are related to costed entities and, optionally, logistical terms and definitions. Characteristics and key figures that are used on objects and edges are configurable. Further, the business logic used to analyze the characteristics and key figures may be configured via formulas. Moreover, a solver module may evaluate the value chain, including the iteration of cycles across all objects in the value chain.

In another embodiment, some of the characteristics may be defined as the business key.

In accordance with yet another embodiment, the definition and evaluation of the relations may be separated. Thus, relations may be always visible on an object level, even if no values have been evaluated yet.

Embodiments of the invention may also enable value chain analysis applications to work with flexible and configurable elements. Value assignments may always be visible on every single object, both in the input and output directions.

In accordance with yet another embodiment of the invention, value assignments can be cyclic and not restricted among the object types. Moreover, through configuration methods of the invention, any type of new, fully integrated or independent application for value chain analysis can be created.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate exemplary embodiments and various aspects of the present invention. In the drawings.

DESCRIPTION OF THE EMBODIMENTS

Figure 1A:
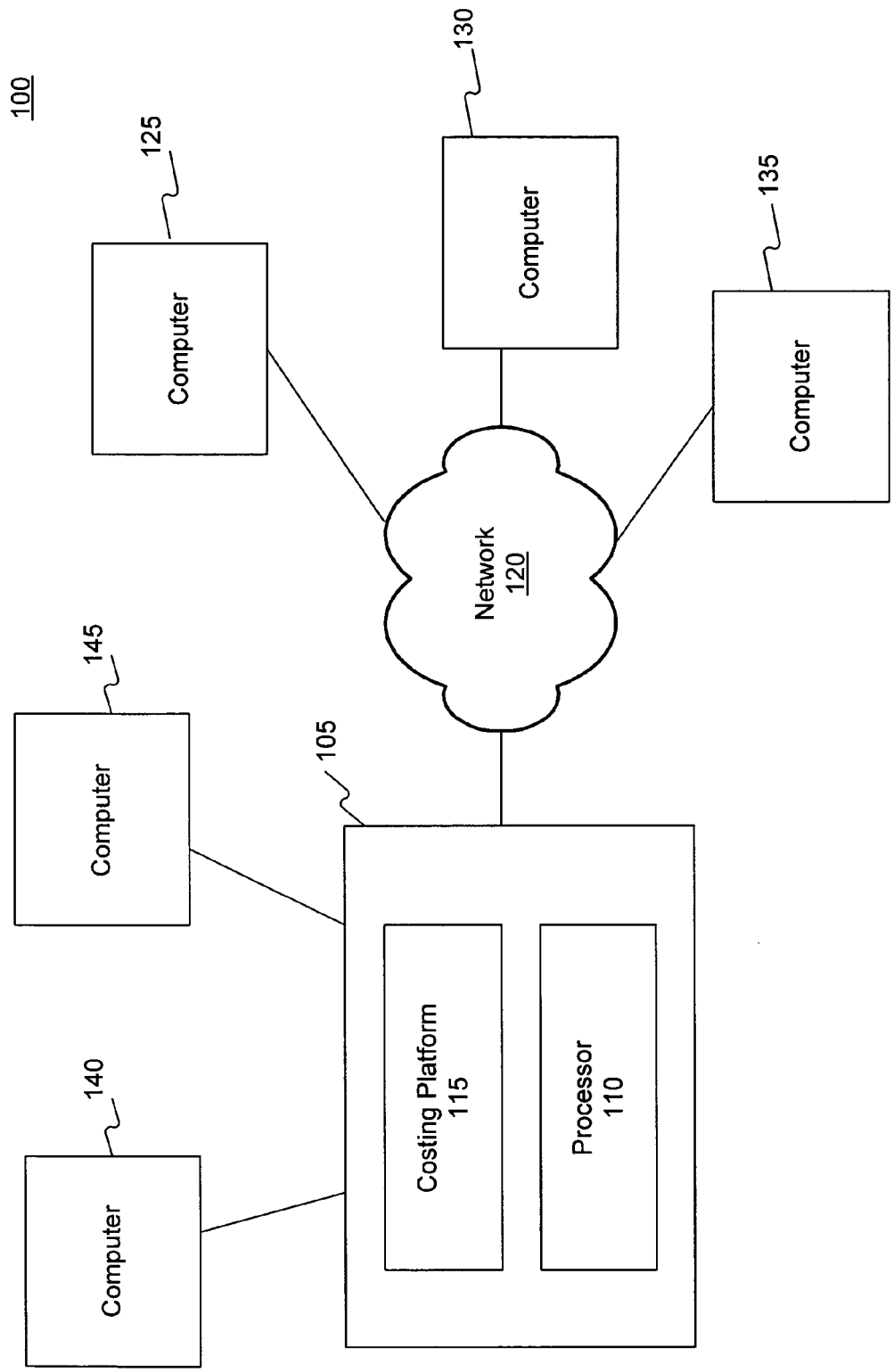
FIGS. 1A and 1B are diagrams of exemplary system architectures for implementing embodiments of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Consistent with the present invention, methods and systems are provided for modeling and performing a value chain analysis. The value chain analysis may be performed on any set of costed entities. The set of costed entities may be modeled by a user through an instantiated network configuration, the instantiated network comprising objects, edges, sub-objects and/or table lines.

As further disclosed herein, methods and systems consistent with the invention may implement a costing platform. The costing platform may provide a foundation for controlling cost analysis. In one embodiment, the costing platform can be universally applied during all phases of, for example, designing and producing a product or service, ranging from standard cost estimates and cost center accounting, such as planning and simulation, through product cost by order or period, such cost object controlling and profitability. Further, users may create new specialized applications without having to use a conventional programming language to perform a value chain analysis.

In order to provide a universal foundation to meet the requirements of a flexible and adaptable controlling process, the costing platform may be created on the basis of value chains for processing value chains and key figures. All value chains may be modeled across the board via the costing platform, so that networks comprised of objects, edges and, optionally, sub-objects related at the objects can be modeled and functions can be added to determine key figures. Key figures are parameters associated with a particular costed entity and define a value for the parameter. For example, key figures associated with a costed entity may include a number and/or a price, and their respective values. Key figures are typically used by businesses to measure performance.

According to one embodiment, the costing platform may utilize metadata to define a network configuration comprising object types and edge types, as well as table types assigned to the object types. As will be appreciated by those skilled in the art, metadata is data that describes other data. For example, metadata may describe how, when, and by whom a particular set of data was collected, as well as how the data is formatted.

In the context of this disclosure, the above-mentioned element types (object types, edge types, and table types) can each have attributes added to them. The attributes may be either freely defined or can be selected at the time of configuration from data elements stored in a database. Such attributes may comprise, for example, key figures and characteristics. In one embodiment, a business key for an element type may be made up from one or more characteristics.

In accordance with one embodiment, by using a costing platform, a user may simulate any activity, such as activities that occur in the life cycle of creating and producing a new product or service. For example, when developing a new product, an individual or group first has an initial idea. This first step, termed the conceptual design of a product, involves developing the initial idea to the point that the product is defined in at least a rudimentary fashion. The next step is to refine the conceptual design, which is done in the detailed design phase. During the detailed design phase, the specifics of the product are determined. This may include deciding not only the specifications of the product, such as size, shape, and components, but also includes selecting the particular materials or parts that will be used to create the product. The next step is to establish the supply chain, which refers to distributors that a business will use to obtain materials for a product, as well as the manner and process that the business will use to actually create the product. This may involve creating assembly lines for large products, selecting workers to assemble products, etc. Actual production of the product follows, which encompasses creating the product and bringing it to market for the lifetime of the product. Other costs that may occur after and during the production phase include maintenance and service of the production system.

Each of these phases of the product life cycle may involve different categories of cost. The actual costs incurred to a business in one phase of the product life cycle may be influenced by the choices that the business made in an earlier phase. Decisions made during the detailed design phase as to the materials selected for the product will ultimately influence the cost of production. For example, if a business decides to select a particular material for use in producing a product, that decision will contribute a certain cost to the product. By examining the cost contribution of a particular decision early in the process, the business can thus minimize costs before decisions are made that cannot be so easily changed.

To simulate the cost of producing a product across the various phases of the product life cycle, systems and methods consistent with the present invention may implement a concurrent costing approach. Concurrent costing enables one to define object types completely independent of firmly established data structures. Instead, the object types may be made up of a combination of characteristics and key figures that the user has determined and that can be influenced by varying the characteristic values of the materials and how they are obtained.

For instance, to produce a product such as a window, a business might require a locking mechanism. Consistent with the invention, an object type may be defined that contains the material that constitutes the locking mechanism. The locking mechanism might include various specifications, such as its size, the actual material, etc. By varying the value of the characteristics of the locking mechanism, the business can evaluate the differences in costs in the planning phase that result from using different materials that are suitable for the mechanism or by varying the supplier of the materials. The same principle can be applied to other object types.

Referring now to FIG. 1A, an exemplary system architecture 100 is provided for implementing embodiments of the present invention. As shown in the example of FIG. 1A, system 100 includes a computer 105, which may be a personal computer, a server or a workstation, for example. Computer 105 includes a processor 110 and a costing platform 115. Costing platform 115 may comprise one or more software applications or modules that are stored in memory. The software associated with costing platform 115 may include program instructions which are executable by processor 110 to provide methods and features consistent with embodiments of the present invention. The costing platform 115 may be implemented as stand-alone software (e.g., a computer program product) or supplied as a module or component in a software package (e.g., an ERP system). A more detail embodiment of a costing platform is described below in relation to FIG. 2.

As further shown in FIG. 1A, computer 105 may be connected to a network 120. Network 120 may, in turn, be connected to one or more additional computers 125,130 and 135. Computers 125-135 may be personal computers, workstations or database servers. Data may be sent to and from computer 105 and computers 125-135 over network 120. By way of example, one or more of computers 125-135 may represent remote or regional sources for importing data to computer 105 for purposes of data consolidation, a group costing analysis, etc.

Network 120 may facilitate communication between the various components in system 100, such as computers 125-135 and computer 105. Network 120 may be a shared, public, or private network and may encompass a wide or local area. By way of example, network 120 may comprise a local area network (LAN), wide area network (WAN), a secure intranet and/or the Internet.

Alternatively, or in addition to computers 125-135, one or more computers 140 and 145 may be directly connected to computer 105. Computers 140-145 may be personal computers, workstations or database servers, and may also transmit data to and from computer 105. By way of example, a user may operate computer 105 directly or in combination with another computer (e.g., any one of computers 140-145 or computers 125-135) to configure and evaluate modeled value chains.

Figure 1B:
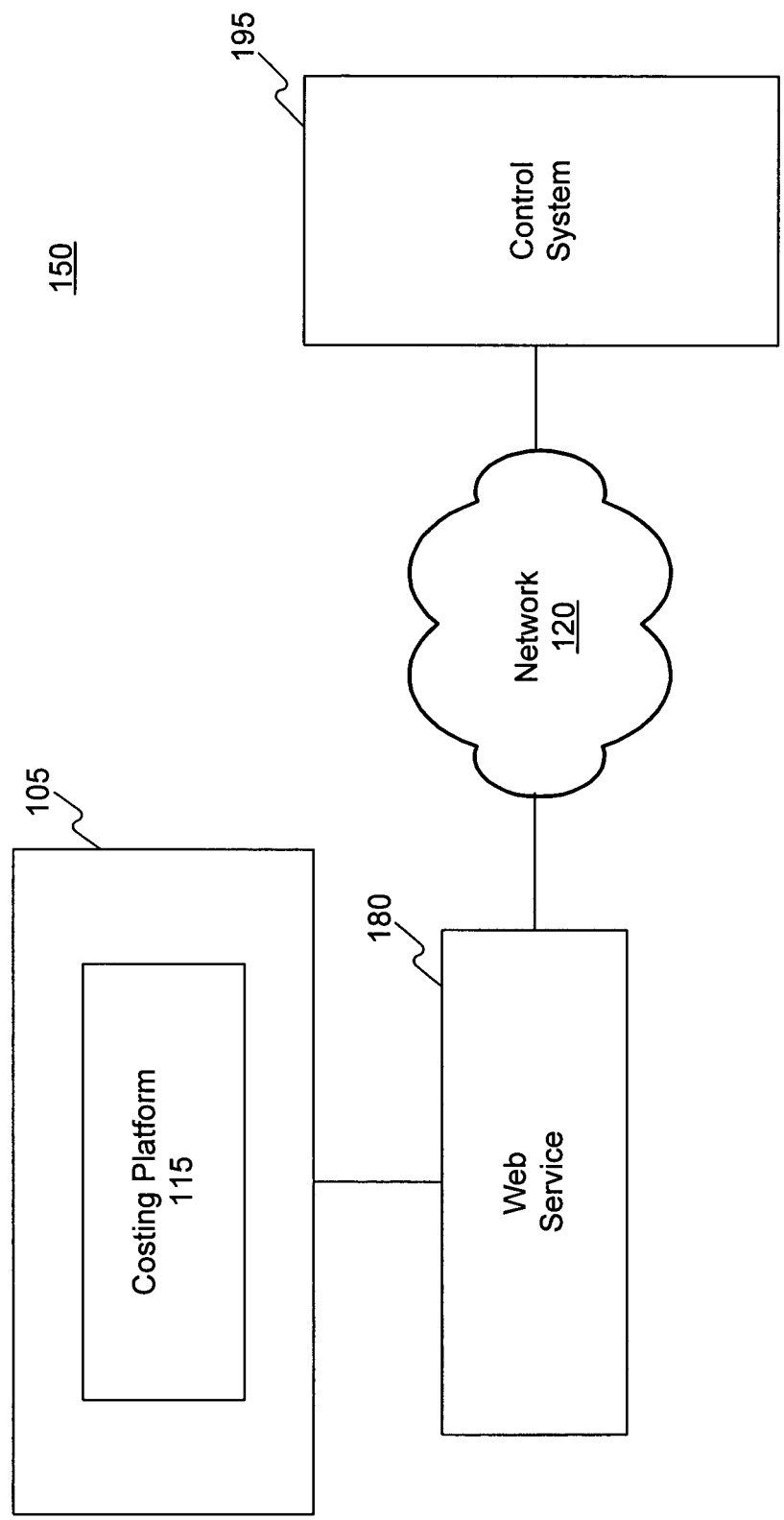

FIG. 1B illustrates another exemplary system architecture 150 for implementing embodiments of the present invention. The example of FIG. 1B may be utilized for implementing a control process based on a value chain analysis. In particular, architecture 15 may include a computer 105 with a costing platform 115 and processor (not shown). These components may be implemented in a similar fashion to that described above to perform a value chain analysis (see FIG. 1A). The results of the value chain analysis may be communicated to a control system 195 to cause an automatic and/or direct control over a process, apparatus or system. In one embodiment, the output of costing platform 115 may act as a direct control signal for system 195. In another embodiment, the results of a value chain analysis may be analyzed and a control signal may be generated to effect necessary control (e.g., the ordering of material, deployment of a resource, operation of a machine, etc.). This may be achieved in whole or in part at the costing platform 115 or control system 195.

As shown in FIG. 1B, the output from costing platform 115 may be communicated to control system 195 via network 120. A web service or server 180 or other conventional means may also be provided to coordinate signaling and/or messaging between platform 115 and control system 195. Examples of conventional messaging formats and communication protocols include, for example, XML and TCP/IP. Examples of systems to implement control system 195 include, for example, manufacturing control systems and production ordering systems. Control system 195 can also be implemented as a control component or software module for an apparatus or equipment (e.g., a manufacturing device).

The embodiments of FIGS. 1A and 1B are exemplary. Modifications to the system environments can be made, including the addition, substitution or combining of components. For example, in the example of FIG. 1B., the web service 180 may be combined with costing platform 115 or provided as an application on computer 105. Further, the number of computers 125-145 in FIG. 1A may be increased or decreased according to the needs of an organization or end user.

Figure 2:
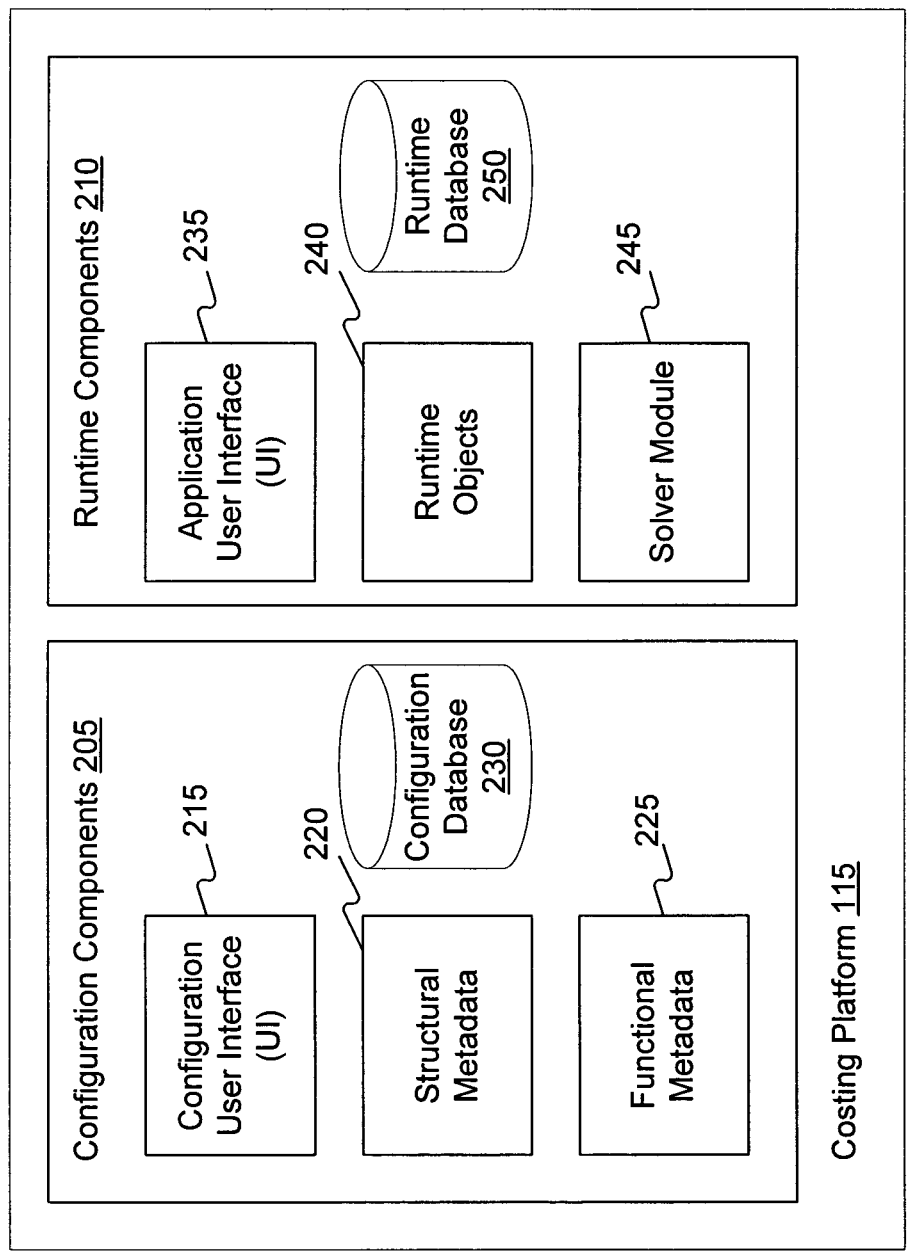
FIG. 2 is a diagram of an exemplary costing platform, consistent with an embodiment of the present invention.

FIG. 2 is a diagram of an exemplary costing platform 115, consistent with an embodiment of the present invention. Costing platform 115 may be used to determine costs and measure performance associated with a set of costed entities, such as activities that occur in the process of designing and producing a product or service, or any other business-related activities.

As disclosed above, costing platform 115 may include one or more software applications or components. These components may comprise configuration components 205 and runtime components 210. These and other components may be provided to implement costing platform 115 in a system environment, such as that illustrated in FIG. 1A.

Configuration components 205 may include a configuration user interface (UI) 215, structural metadata 220, and functional metadata 225. Configuration UI 215 may generate one or more graphical user interfaces (GUIs) to receive input from and provide output to a user. Through the configuration UI module 210, for example, a user may control costing platform 115 to create structural metadata 220 and functional metadata 225 and configure a network for any set of costed entities. Structural metadata 220 may provide relationships used to configure the network for any particular set of costed entities. Functional metadata 225 may provide functions, such as formulas or statements, that are used in the network configuration. When creating functional metadata, a user may define a formula per attribute of the object types and edge types that will be calculated during runtime. For example, functional metadata 225 may represent a costing formula, such as a relationship between the price and quantity of a product.

Moreover, consistent with embodiments of the invention, structural metadata may be used to optionally define a hierarchy between object types, resulting in one or more sub-objects underneath an object. Sub-objects may be implemented, for example, when there is a need for performing parallel costings for one object, such as multiple cost estimates for one material. In such a case, edges may be established between the objects. By way of an example, an object (e.g., material) may have a business key (e.g., material number) and one or more sub-objects (e.g., cost estimates) related to this object may be defined, each having a business key (e.g., costing version/material number).

In yet another embodiment, the structural metadata may additionally define other element types. For example, as disclosed herein, a user may define posting level types, context types and/or model version types.

By way of further example, configuration UI 215 may generate one or more GUIs to assist a user in defining and entering metadata (functional and structural). Such GUIs may include conventional screen elements, such as menus, lists, tables, icons, action buttons, and selection or text entry fields, for this purpose. To configure a network for business-related activities, a user may define one or more object types, as well as edge types (see, for example, FIG. 3). Attributes for the object and edge types may be defined. In one embodiment, key figures and characteristics may be defined for object types and edge types. For example, to perform an analysis for overhead management, structural metadata may be defined including: context (e.g., currency/location/controlling area); posting level (e.g., fiscal year/period); and model version (e.g., costing version). In addition, one or more object types may be defined, such as resource, activity, costing object, primary costs, etc., as well as attributes for the object types, such as key figures for costs/quantities, revenue/profit, etc. Moreover, a user may define necessary edge types with key figures for value flow, and other characteristics like cost elements or other drivers.

As further shown in the exemplary embodiment of FIG. 2, configuration components 205 may also include a configuration database 230, which may include metadata and any other data used by configuration components 205. In one embodiment, configuration database 230 is implemented as a metadata persistency for storing structural and functional metadata defined by the user. During runtime, the system may use the stored metadata to execute a set-up application, based on the network configuration that contains instances of the object types, instances of the edge types and/or instances of other element types (e.g., table lines). These instances may be provided as runtime objects for performing a value chain analysis, as further described below.

Consistent with embodiments of the invention, other configuration components or tools may be provided to assist a user to configure the network of costed entities to be evaluated. For example, a formula builder (not shown) may be provided to assist a user in creating and building formulas that define functional relationships or dependencies between attributes of element types in the network. Additionally, a library manager (not shown) may be provided that stores and/or facilitates access to predefined formulas or formula templates. Such formulas or functions may be grouped by topic (e.g., financial accounting equations to analyze key figures) and selected by a user. Further, topology rule metadata (not shown) may be provided that provides error and syntax checking functionality. For example, a topology rule may be defined that establishes if a particular object type can be a possible sender for other object types, but never used as a receiver object. In another embodiment, rules may be provided to define when to create new objects and edges and, thus, allow a change in a network topology.

Consistent with embodiments of the invention, rules may define objects and edges. This functionality may be implemented to allow a user to derive relationships between objects using other attributes. For example, in the case of product costing, a rule may be defined to use a characteristic of a product to estimate the need of a special process (e.g., a part of an airplane may require extra quality testing). As a further example, for overhead cost management, instead of measuring or planning the exact activities performed by a human resources (HR) department for other departments, the number of employees of the other departments might be used as an estimate for this effort. In such a case, a rule may define a relationship established between the HR department and all departments in this part of the company.

As shown in FIG. 2, runtime components 210 may include an application user interface (UI) 235, runtime objects 240, and a solver module 245. Application UI 215 may generate one or more graphical user interfaces (GUIs) to receive input from a user and provide output. Through the application UI 210, a user may select a network configuration and, if one or more model versions of the network are implemented, the user may also select a model version. Based on the selection(s) by the user, the solver module 245 may evaluate attributes of runtime objects 240 using formulas to perform a value chain analysis on the instantiated network of costed entities. Runtime objects 240 may form the model including objects and edges and, additionally, table lines, as discussed more fully below. Based on a user's selection, runtime objects 204 may be based on loaded network type from a metadata persistency (configuration database 230).

Solver module 245 may perform various functions, including mapping the relationships and quantity structure of resources, processes, and goods (e.g., products or services), as well as supplies prices and valuations to costing objects. Solver module 245 may be adapted to evaluate a data model (instantiated network configuration) for performing a value chain analysis. The model may be based on data provided as input or accessed from runtime database 250, runtime objects 240, and/or other sources (such as computers 125-145; see FIG. 1A). The model may be used to evaluate various costed entities, such as activities related to producing a product. In one embodiment, the value chains analyzed by solver module 245 may be defined and analyzed based upon a graph theory that comprises objects and edges. Objects and edges may define value relations between costed entities. An exemplary implementation for creating a network configuration of costed entities is discussed in further detail below with reference to FIG. 3.

Various methodologies may be implemented with solver module 245 to control the order in which objects and edges are evaluated. In one embodiment, cells may be defined based on attributes of the objects and edges. Once the cell values are set, the solver module 245 may recursively evaluate all cells by applying corresponding values and formulas. Other methodologies and algorithms may also be implemented with solver module 245, as will be appreciated by those skilled in the art.

As further shown, runtime components 210 may include a runtime database 250, which may store runtime objects, as well as any other data for the runtime environment. Runtime components 210 may also include a formula runtime module (not shown) for evaluating formulas and a topology rule runtime module (not shown) for creating objects and edges based on rules.

Figure 3:
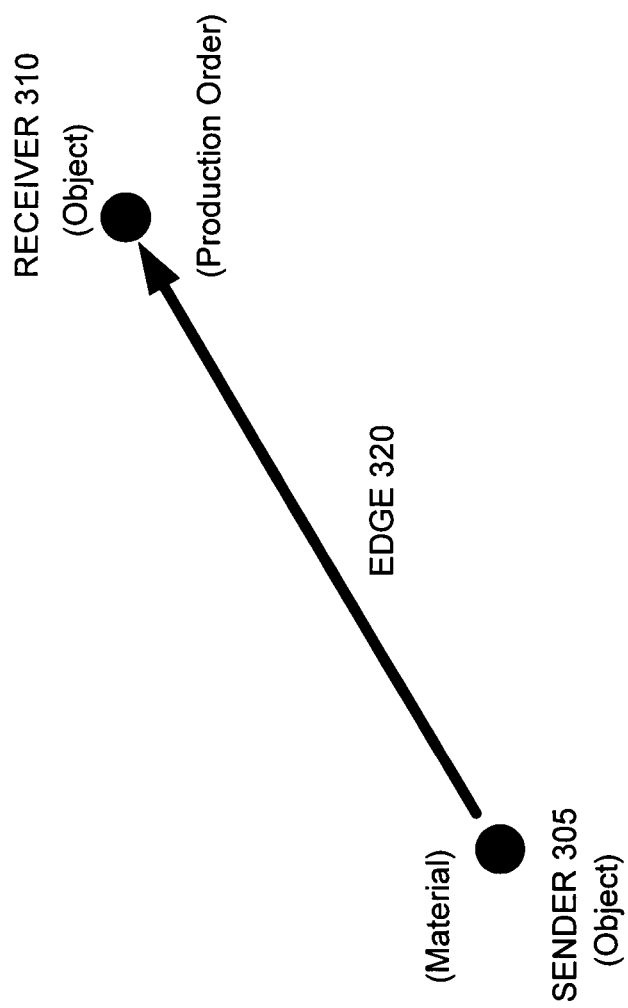
FIG. 3 is a diagram of an exemplary components for creating a network configuration for costed entities, consistent with an embodiment of the invention.

Referring to FIG. 3, a diagram is provided to explain an exemplary implementation for creating a network configuration of costed entities. As disclosed herein, object types, edge types and, optionally, table types are exemplary elements which may be used to configure a network.

Consistent with an aspect of the invention, object types may contain descriptive attributes and data. Further, object types may contain key figures related to a costed entity. Edges, on the other hand, may be the relationships that are defined between two objects. Edges have attributes and such attributes can be key figures or characteristics. In one embodiment, there may be a 1:n relationship between objects and sub-objects. This may allow additional key fields and a Global Unique ID (GUID) to be assigned to each sub-object. Further, consistent with an aspect of the invention, each sub-object may be directly linked to an object by the GUID of the object.

Referring to the exemplary implementation shown in FIG. 3, a sender 305 is provided. Sender 305 is an object or, more specifically, a sender object. Sender 305 may relate to an object type, for example, a material, and may have an attribute which may have a value, such as the price of the material. In relation to sender 305, a receiver 310 is provided. Receiver 310 is receiver object and relates to an object type, for example, a production order which is a consumer of the material represented by sender 305. Edge 320 is a representation of the flow and quantity of flow that occurs between the illustrated objects, sender 305 and receiver 310. As an example, the flow could express the consumption of material in relation to the production order. For example, the flow may be represented by an attribute (e.g., quantity flow) and the value of that attribute may be evaluated by a formula which expresses the amount of material consumed multiplied by the unit price of the material.

Figure 4:
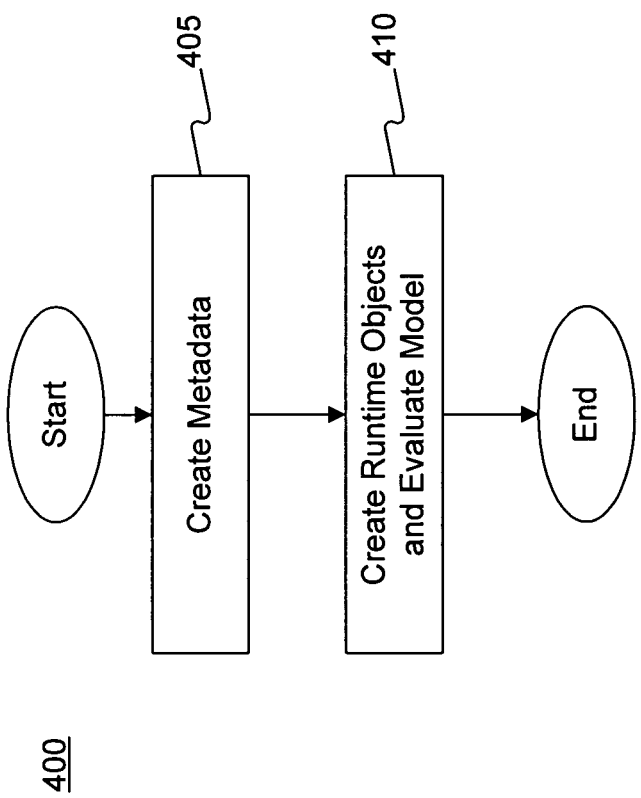
FIG. 4 is a simplified flow diagram of an exemplary method for creating metadata for a network configuration and performing a value chain analysis, consistent with an embodiment of the invention.

FIG. 4 is a flow diagram of an exemplary method 400 for creating metadata and performing a value chain analysis, consistent with an embodiment of the invention. In the first step of the process (step 405), a network configuration is created for any set of costed entities (i.e., one or more costed entities). The network may comprise a collection of element types (e.g., object types, edge types and/or table types) and, optionally, level types and model version types. The network configuration may be created by a user by defining metadata. For example, in one embodiment, a user may create metadata using costing platform 115. The metadata may comprise structural and functional metadata to define a network of object types, edge types and/or table types. As disclosed above, the user may define attributes, formulas and other parameters for these element types by operating a computer with a graphical user interface (GUI) (see, for example, FIGS. 1 and 2).

By way of example, as part of step 405, key fields and attributes of element types in the network, as well as values associated with edge types may be defined by the user. In one embodiment, the values for edge types may describe flow and quantity of flow. In addition, table types may also be provided for the network. By way of example, table types may contain formulas or statements for specifying calculations. Formulas or statements may be user defined and/or may be based on re-useable formulas that are stored in a database or library. An exemplary implementation of step 405 is discussed in greater detail in connection with FIG. 5.

The next step shown in the example of FIG. 4 is to create runtime objects and perform an evaluation of the model, at step 410. The evaluation may be performed by the costing platform or, in particular, a solver module of the costing platform (see, for example, FIGS. 1 and 2). Runtime objects may be created by loading a network configuration, the runtime objects representing a model of the costed entities. As part of this process, step 410 may include evaluating formulas defined by the functional metadata by accessing attribute values and by setting the result values into the runtime objects. An exemplary implementation of step 410 is discussed in greater detail in connection with FIG. 6.

Figure 5:
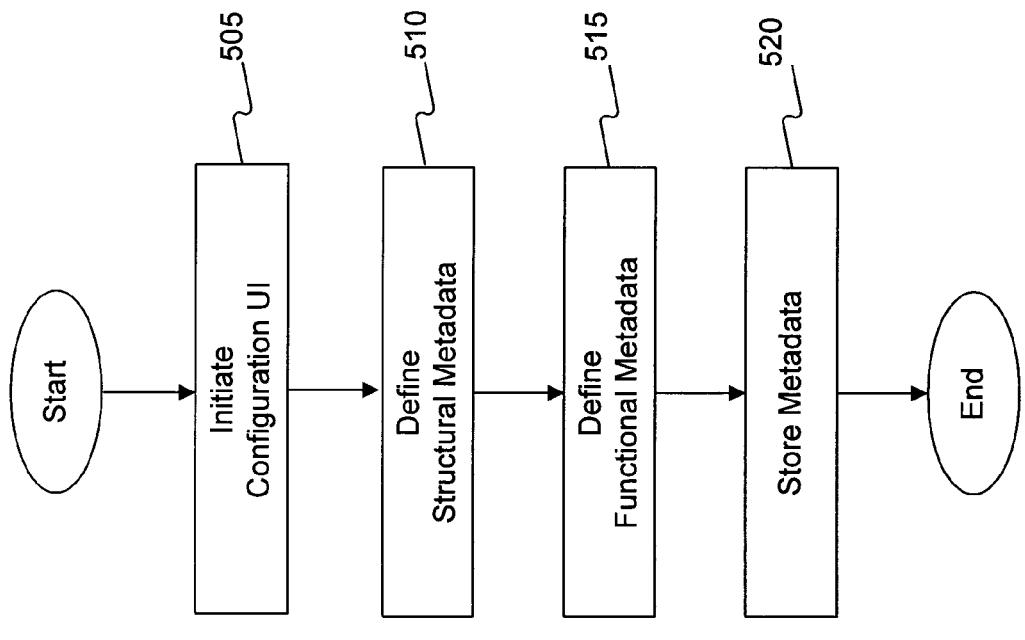
FIG. 5 is a flow diagram of an exemplary method for configuring a network with metadata, consistent with an embodiment of the present invention.

FIG. 5 is a flow diagram of an exemplary method 405 for creating metadata to configure a network, consistent with an embodiment of the present invention. For purposes of illustration, method 405 will be described with reference to the embodiments of FIGS. 1 and 2, and the costing platform 115 thereof.

In step 505, a user initiates configuration UI 215. This may be done, for example, at a computer (e.g., one of computers 125-145) by selecting an appropriate menu option or desktop icon. As disclosed herein, the configuration UI may generate one or more GUIs to assist the user in configuring and defining the value network. Such GUIs may include conventional screen elements (e.g., menus, lists, tables, action buttons, text or selection entry fields, etc.) to enable data entry and selection.

Using the GUIs generated by the configuration UI, the user may first define structural metadata, at step 510. Further, using the GUIs generated by the configuration UI, the user may define all necessary functional metadata, at step 515. As disclosed above, to configure a network for any set of costed entities (such as business-related activities), the user may define one or more object types, as well as edge types. Attributes for the object and edge types may be defined, as well as key figures. Further, the user may define functional metadata by way of formulas. In one embodiment, a formula may be defined per attribute of the object types, edge types and, optionally, table types that will be calculated during runtime.

Once all of the necessary structural and functional metadata has been created, the metadata may be stored, at step 520. Storage of the metadata may be carried out using, for example, configuration database 230. In one embodiment, configuration database 230 may be implemented as a metadata persistency for storing the structural and functional metadata defined by the user. During runtime, the system may use the stored metadata to execute a set-up application, based on the network that contains instances of the object types and instances of the edge types.

Figure 6:
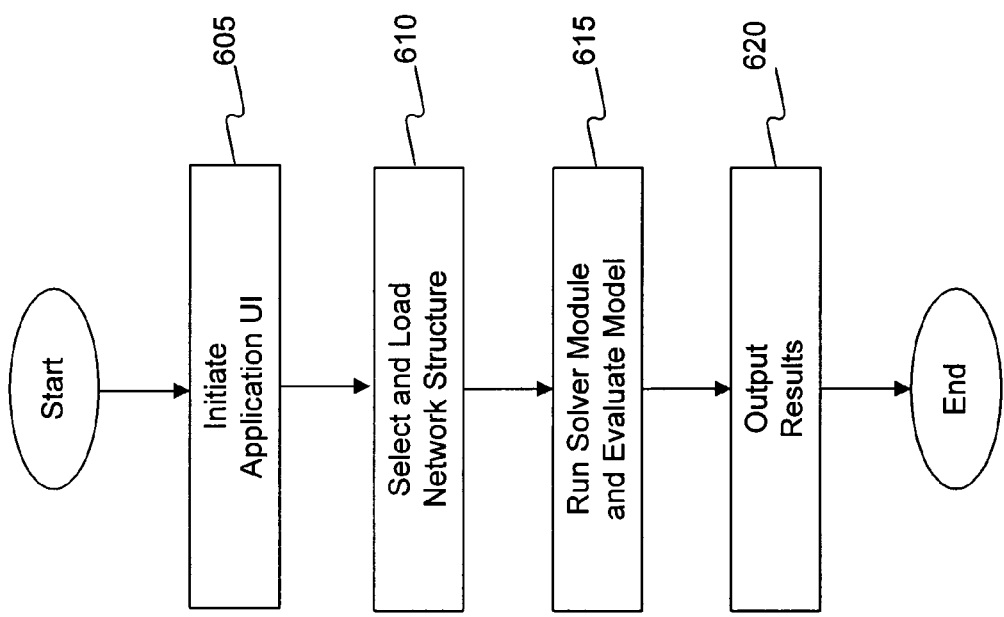
FIG. 6 is a flow diagram of an exemplary method for creating runtime objects and evaluating a model, consistent with an embodiment of the present invention.

Referring now to FIG. 6, a flow diagram of an exemplary method 410 is provided, consistent with an embodiment of the present invention. Method 410 may be implemented for creating runtime objects and evaluating a model (step 410 of FIG. 4). Once again, for purposes of illustration, reference will be made to the embodiments of FIGS. 1 and 2, and the costing platform 115 thereof, to describe the method.

At step 605, a user starts application UI 235. This may be done, for example, at a computer by selecting an appropriate menu option or desktop icon. Next, at step 610, the user may select a network that has been previously configured and stored. This selection may be performed using a GUI generated by application UI 235 (FIG. 2), wherein the GUI displays a list of available network structures for evaluation. In one embodiment, network configurations may be selected and accessed by version or name. Selection of a network structure may cause that network to be automatically loaded into the runtime environment. Loading of the network may include creating the appropriate runtime objects 240 to generate instances of the object types and edge types. As part of step 610, additional sub-network structures can also be manually created or imported (e.g., from a CAD system, a production system (bill of material), or decentralized systems). Additionally or alternatively, adjustments or modifications may be made to the network during step 610. For example, in one embodiment, pre-configured networks may be supplied by a software vendor and then later adjusted by a project team or customer using the software to implement modifications consistent with a company's particular needs. As another example, in one embodiment, a user may be permitted to define rules for creating new objects and/or edges. Additionally, or alternatively, such rules may be defined during configuration of the network.

After the user has selected and loaded the network and made any necessary changes (optional), the solver module 245 may be initiated at step 615 to evaluate the model (i.e., the instantiated network configuration represented by the runtime objects). As part of this process, solver module 245 may evaluate the runtime objects 240 associated with the network. Further, a request for an evaluation of key figures associated with the selected network may be sent to solver module 245, which evaluates formulas as defined in the functional metadata. This may involve accessing the attribute values and then setting result values in the runtime objects 245. In step 620, the results of the evaluation may be provided as output. This step may include printing or downloading the results to memory. Additionally, or alternatively, a GUI of application UI 235 may be refreshed to display the results of the evaluation process to the user.

The exemplary methods of FIGS. 4, 5, and 6 may be implemented in a computerized environment or system, such as that illustrated in FIGS. 1 and 2. However, embodiments of the invention are not limited to such examples and other systems environments may be utilized. To provide a consistent basis for an adaptable, integrated and flexible analysis of value chains, solver module 245 can process characteristics and key figures along a value chain. Using solver module 245 via application UI 235, a user can evaluate any kind of network comprised of object types, edge types, and table types. Key figures, which may include benchmarks monitored by businesses to judge performance, may be used in the network and can be defined and evaluated via formulas. That way, a user may conduct simulations, planning, and actual calculations on any level of detail.

The above-described methodologies may be used by a content developer at a software vendor or a business consultant of the customer of the software vendor. Such a user may implement the above-described costing platform to create new applications by configuring structural and functional metadata. Additionally, a project team might configure software modules to add new objects by adding structural metadata or new functionality by adding functional metadata to define formulas.

As disclosed herein, solver module 245 may act on several components, such as metadata and configuration components including object types, edges types, and/or table types. In one embodiment, a table type may be an optional extension of the costing platform functionality to freely define additional data stores with a key and attributes to be used in formulas. By way of example, a table may contain (e.g., interest rates, depreciation rates, currency exchange rates, etc.) to evaluate a flow. The key of a table may be a business key, which may correspond to a business key of an object or sub-object, such as an attribute. Further examples of object types, edge types, and table types are discussed in more detail in connection with FIG. 7, and an example of such an implementation for a runtime environment is described with reference to FIG. 8.

Figure 7:
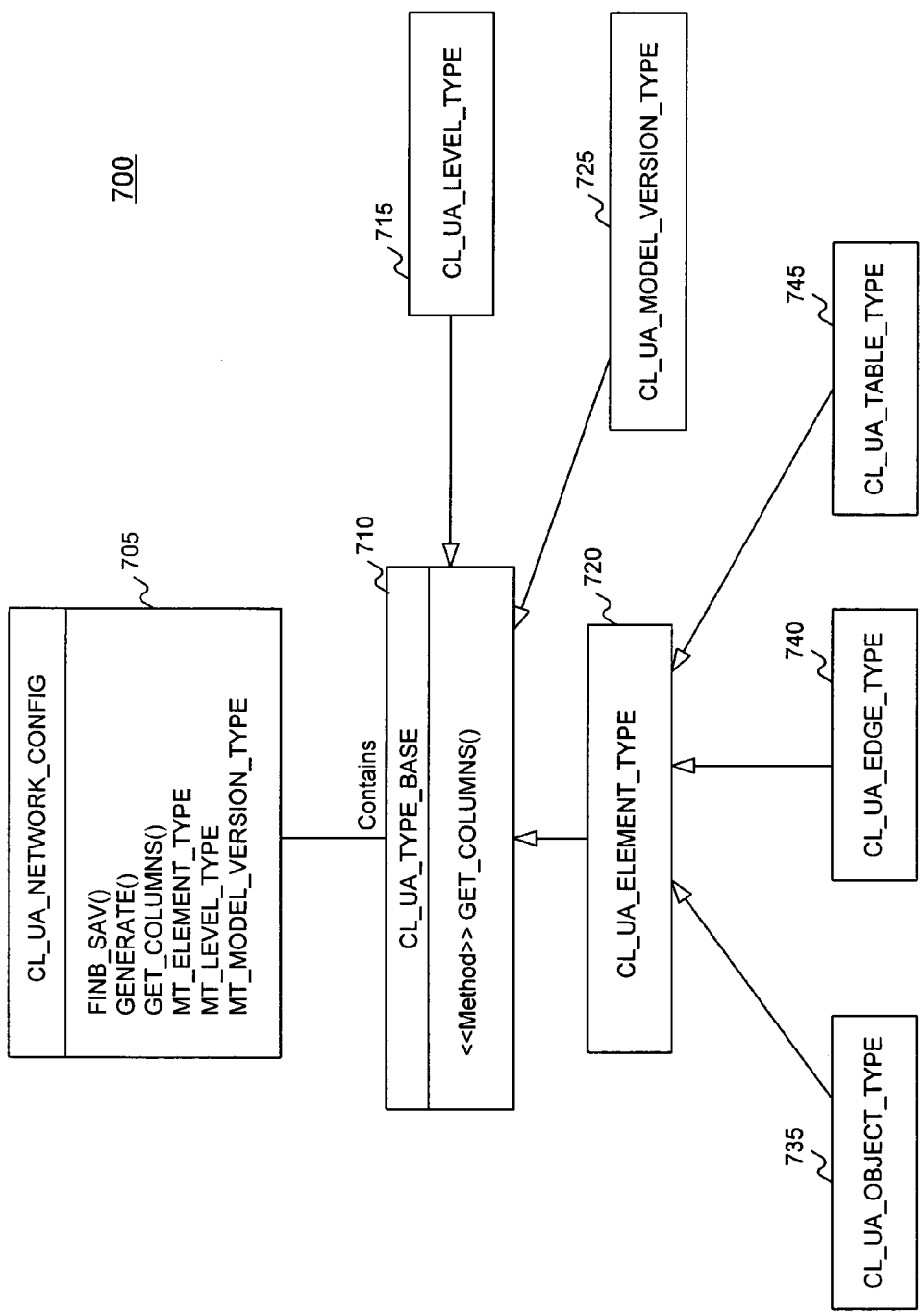
FIG. 7 is an exemplary UML diagram of metadata for a network configuration, consistent with an embodiment of the present invention.

FIG. 7 is an exemplary Unified Modeling Language (UML) diagram 700 of metadata for a network configuration 705, consistent with an embodiment of the present invention. Reference numerals 705-745 show metadata and their relationships. Object type 735, edge type 740, and table type 745 are specializations or sub-classes of element type 720. In particular, object and table types allow a user to define key attributes. These attributes form a semantical or business key of a corresponding object or table line. That way, a user may define multi-dimensional object types. Thus, any type of business assessment levels can be modeled as object types and included into the value chain. Optionally, a context type, a model version type and a level condition type can be defined. The model version and level condition type may include key attributes.

Topologically, the element types may relate to each other in the following way: In the described runtime, instances of the defined element types can be used. This means a network of objects, edges, and table lines will be created. For example, an object instance will be created to represent a cost entity. A sub-object may be dependent on an object. An edge is directional and has a sender and receiver object. The table lines define information in addition to the network, which can be used in formulas, as described below.

If a context type exists (not shown in FIG. 7), one instance of a context will be created per network that contains additional global information to be used in formulas (e.g., interest rate, currency, etc.). If a model version type exists (such as model version type 725 in FIG. 7), the model version keys may be used as additional keys in objects and edges. This enables one to have several versions of the same network to model different scenarios. Objects, on the other hand, may be independent of the model version.

If a level type exists (such as level type 715 in FIG. 7), the attributes on objects and edge types may be distinguished into header and item attributes. The item attributes may also contain the level condition key on the objects and edges during runtime. This enables a user to store some attributes on a more detailed level, such as a posting period of a month/year.

All element types can use functions on attributes, which can access related element instances. In that way, a formula on an attribute of an edge can access attributes of the sender or receiver object and entity. For example, a formula can be attached to an edge attribute "Used Quantity." The formula may be expressed as "UsedQuantity=StandardRequiredQuantity×Receiver.Lot-Size."

A runtime environment may manage the instances of elements defined in the metadata. In other words, the objects, edges, tables and their relationships may be managed and made available for manipulation via a simple application program interface (API). The API may permit a user to add objects, insert a sub-object, set the sender of edge, etc. Read access to the tables defined via the table types may be available using generated access functions. In one embodiment, the tables may be used for mapping things such as, overhead cost rates, sales price markups or cutting factors. An exemplary runtime enviroment is described in more detail in connection with FIG. 8.

Figure 8:
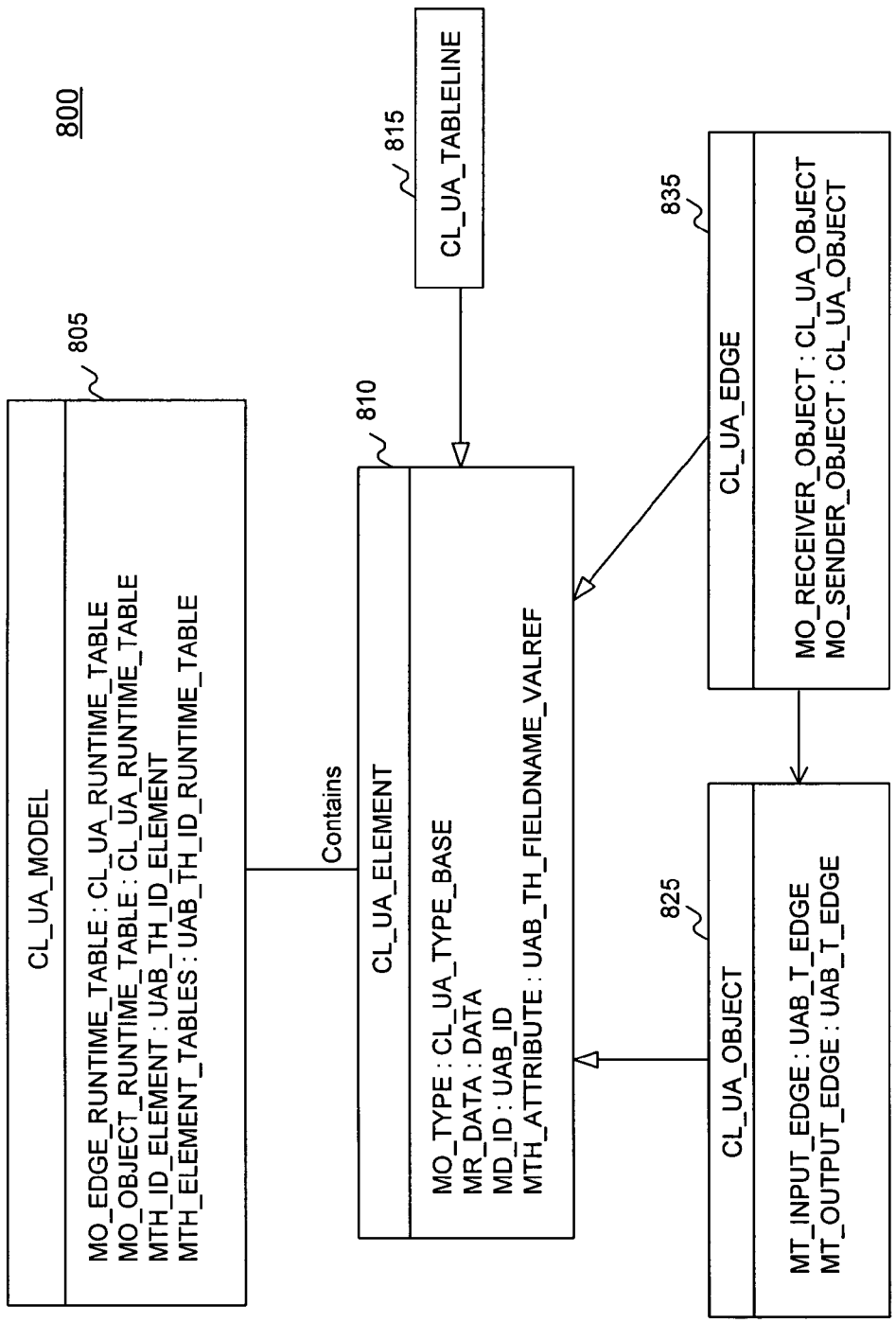
FIG. 8 is an exemplary UML diagram for a model in a runtime environment, consistent with an embodiment of the present invention.

FIG. 8 is an exemplary UML diagram 800 for a model 805 in a runtime environment, consistent with an embodiment of the present invention. Reference numerals 805-835 show relationships in a runtime environment. Object 825, edge 835 and table line 815 are specializations or sub-classes of element 810. Element 810 may include a formula for computing a value based on object 825 and edge 835, for example. Element specific formulas can be re-defined and override formulas that have been set on a corresponding attribute in an element type. Accordingly, a flexible business logic can be defined in the model. Since the elements are configurable via the metadata, the edges can be used for all types of value assignments. It is thus possible to have one unique method and evaluate a complete network of different relations at once.

Optionally, hierarchy objects can be used in the runtime environment to group several other objects in a hierarchical way. Furthermore, selection conditions for objects can be specified on a hierarchy object, so they represent a dynamic set of objects that can change when entities are added, deleted or changed. Hierarchy objects as a special type of object can be senders or receivers on an edge. That way, value relations between several objects can be easily created.

As disclosed herein, the costing platform may include a solver component or module that makes it possible to calculate the attributes under which formulas were stored in the metadata for all instances. The solver may provide a "costing" function that evaluates the network. In particular, the solver may process all instances and their attributes iteratively and recursively on the basis of the freely definable formulas, by evaluating the formulas. A marker may be set in each formula to branch off to the inbound attributes of the adjacent elements and, if required, these attributes may likewise be determined when they can support formulas again. Cyclical dependencies may ensure that the calculation process is finite, via a counter that determines how often an attribute of an instance has already been visited or by means of a value change requirement to cancel. During the evaluation, the solver may evaluate attribute after attribute.

The costing platform or system environment may also include a generator. In one embodiment, a persistence layer may be created by the generator, which creates relational database tables according to the configuration of the platform. The tables may represent the network topology, including all defined attributes of all elements. In the persistence layer, runtime element instances may be saved in relational database tables. Alternatively, these element instances may be saved in XML-flat files. The persistence layer may read part of the network and load it into the runtime environment for further processing. This can be done with a selection condition. For example, all objects and edges related to a costed entity with product number xy, or a certain strategy, such as starting with one object and read recursively all sender objects, may be used to process the data.

In accordance with another embodiment, several users may be allowed to access a portion of the network at the same time, but only one user may have authority to alter the data. The multi-user feature may be useful for a value chain analysis application. This may be especially true for a planning application when, for example, several cost center managers work on their partial planning and a business unit analyst wants to see the progress of the overall planning.

Embodiments of the invention may be used to implement various financial methodologies and analytical processes, and any type of value chain analysis. By way of example, embodiments of the invention may be implemented for controlling costs and planning business processes. By way of further non-limiting examples, embodiments of the invention may be implemented for process planning and running a manufacturing plant, for producing a product or providing a service, for managing resources or personnel, as well as for controlling or determining pricing.

In one embodiment, systems and methods consistent with the present invention are implemented in a SAP R/3 environment and/or using components such as BAPI, etc. In another embodiment, the inventive systems and methods may be used in place of SAP ERP CO component(s) and/or used in SAP SEM for analytical applications.

As will be appreciated, embodiments of the invention are not limited to costing applications or evaluations. The principles of the invention may be applied to modeling and evaluating any entity alone or as part of a value chain analysis. Thus, embodiments of the invention extend to systems and methods for modeling and analyzing value networks for optimizing, for example, operating efficiency or longevity (such as for a machine), customer value or satisfaction, etc.

Embodiments of the invention are also directed to systems and methods for controlling a process, apparatus or system based on a value chain analysis. The process or apparatus control may be automatic and/or directly effected based on the results of a value chain analysis. Thus, for example, a particular material may be selected and ordered for a new product if that material is indicated as being an optimum choice based on cost, etc. As a further example, the operating speed or rate of manufacturing equipment may be controlled based on the results of one or more value chain analyses. In one embodiment, an optimizer may be provided for evaluating a set of value chain results and automatically implementing actions to control a process or apparatus based on that evaluation.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method comprising the following operations performed with at least one processor:
creating a network of costed entities based on an input from a user, the network including edges linking the costed entities in a value chain, the costed entities having attributes and associated with costs relating to business activities, the attributes affecting the costs;
receiving, from the user, a change in at least one attribute associated with at least one of the costed entities;
analyzing the costs associated with the costed entities by evaluating the attributes, including the change in the at least one attribute received from the user, using formulas associated with the costed entities along the value chain;
determining a difference in costs resulting from the change in the at least one attribute; and
outputting a result of at least one of the analyzing the costs or the determining the difference to the user,
wherein the formulas are defined by functional metadata.

2. The method according to claim 1, further comprising:
creating the functional metadata,
and wherein the formulas define functional relationships between the costed entities of the network.

3. The method according to claim 1, further comprising:
storing the network in a persistent storage.

4. A system comprising:
a configuration user interface adapted to receive an input from a user;
a processor configured to execute a set of instructions to:
create a network of costed entities based on an input received from a user through the configuration user interface, the network including edges linking the costed entities in a value chain, the costed entities having attributes and associated with costs relating to business activities, the attributes affecting the costs,
wherein the configuration user interface is further adapted to receive, from the user, a change in at least one attribute associated with at least one of the costed entities;
a configuration database storing the network of costed entities;
a solver module configured for:
analyzing, using the processor, the costs associated with the costed entities by evaluating the attributes, including the change in the at least one attribute received from the user, using formulas associated with the costed entities along the value chain; and
determining, using the processor, a difference in costs resulting from the change in the at least one attribute; and
a display for outputting a result of at least one of the analyzing the costs or the determining the difference to the user,
wherein the formulas are defined by functional metadata.

5. The system of claim 4, wherein the costed entities represent business-related activities and wherein the formulas are configured for evaluating the attributes for the business-related activities.

6. The system of claim 4, wherein the configuration database comprises a persistent storage for storing the network.

7. The system of claim 4, further comprising:
a runtime database storing runtime objects based on an instance of the network, wherein the solver module is adapted to evaluate the runtime objects.

8. The system of claim 7, wherein the runtime objects comprise at least one of the costed entities, the edges, and tables.

9. The system of claim 4, wherein the attributes contain descriptions.

10. The system of claim 4, wherein the attributes contain key figures.

11. The system of claim 4, wherein the edges define relationships between the costed entities.

12. A computer-implemented method comprising the following operations performed with at least one processor:
creating a network of costed entities representing business-related activities based on an input from a user, the network including edges linking the costed entities in a value chain, the costed entities having attributes and associated with costs relating to business activities, the attributes affecting the costs;
receiving, from the user, a change in at least one attribute associated with at least one of the costed entities;
analyzing the costs associated with the costed entities by evaluating the attributes, including the change in the at least one attribute received from the user, using formulas associated with the costed entities along the value chain;
determining a difference in costs resulting from the change in the at least one attribute; and
outputting a result of at least one of the analyzing the costs or the determining the difference to the user,
wherein the formulas are defined by functional metadata.

13. The method according to claim 12, further comprising:
creating the functional metadata for the network,
and wherein the formulas define functional relationships between the costed entities of the network.

14. A computer-implemented method comprising the following operations performed with at least one processor:
receiving, in an input from a user, a selection of a network of costed entities, the network including edges linking the costed entities in a value chain, the costed entities having attributes and associated with costs relating to business activities, the attributes affecting the costs;
receiving, from the user, a change in at least one attribute associated with at least one of the costed entities;
loading the network into a runtime environment;
creating runtime objects representing the network;
initiating a solver module to:
analyze the costs associated with the costed entities by evaluating the attributes, including the change in the at least one attribute received from the user, using formulas associated with the costed entities along the value chain; and
determine a difference in costs resulting from the change in the at least one attribute; and
outputting a result of at least one of the analyzing the costs or the determining the difference,
wherein the formulas are defined by functional metadata.

15. The method of claim 14, wherein the formulas are configured for evaluating key figures.

16. The method of claim 14, wherein the attributes contain descriptions.

17. The method of claim 14, wherein the attributes contain key figures.

18. The method of claim 14, wherein the edges define relationships between the costed entities.

19. The method according to claim 14, wherein outputting the result of at least one of the analyzing the costs or the determining the difference comprises outputting the result to at least one of the user and a control system.

20. A computerized system comprising:
a processor configured to execute a set of instructions to:
create a network of costed entities based on an input received from a user, the network including edges linking the costed entities in a value chain, the costed entities having attributes and associated with costs relating to business activities, the attributes affecting the costs;
receive, from the user, a change in at least one attribute associated with at least one of the costed entities;
analyze the costs associated with the costed entities by evaluating the attributes, including the change in the at least one attribute received from the user, using formulas associated with the costed entities along the value chain; and
determine a difference in costs resulting from the change in the at least one attribute; and
a display for outputting a result of at least one of the analyzing the costs or the determining the difference,
wherein the formulas are defined by functional metadata.

21. The system according to claim 20, wherein the formulas define functional relationships between the costed entities of the network.

22. The system according to claim 20, further comprising:
a persistent storage for storing the network.

23. A non-transitory computer readable medium comprising programmable instructions executed by a processor to perform a method comprising:
creating a network costed entities representing business-related activities based on an input from a user, the network including edges linking the costed entities in a value chain, the costed entities having attributes and associated with costs relating to business activities, the attributes affecting the costs;
receiving, from the user, a change in at least one attribute associated with at least one of the costed entities;
analyzing the costs associated with the costed entities by evaluating the attributes, including the change in the at least one attribute received from the user, using formulas associated with the costed entities along the value chain;
determining a difference in costs resulting from the change in the at least one attribute; and
outputting a result of at least one of the analyzing the costs or the determining the difference,
wherein the formulas are defined by functional metadata.

24. The non-transitory computer readable medium according to claim 23, wherein the method further comprises:
creating the functional metadata for the network,
and wherein the formulas define functional relationships between the costed entities of the network.

25. A non-transitory computer readable medium comprising programmable instructions executed by a processor to implement a method comprising:
receiving, in an input from a user, a selection of a network of costed entities, the network including edges linking the costed entities in a value chain, the costed entities having attributes and associated with costs relating to business activities, the attributes affecting the costs;
receiving, from the user, a change in at least one attribute associated with at least one of the costed entities;
loading the network into a runtime environment;
creating runtime objects representing the network;
initiating a solver module to:
analyze the costs associated with the costed entities by evaluating the attributes, including the change in the at least one attribute received from the user, using formulas associated with the costed entities along the value chain; and determine a difference in costs resulting from the change in the at least one attribute; and outputting a result of at least one of the analyzing the costs or the determining the difference, wherein the formulas are defined by functional metadata.

26. The non-transitory computer readable medium of claim 25, wherein the formulas are configured for evaluating key figures.

27. The non-transitory computer readable medium of claim 25, wherein outputting the result of at least one of the analyzing the costs or the determining the difference comprises outputting the result to at least one of the user and a control system.

* * * * *